US007980523B2

(12) United States Patent
O'Neil et al.

(10) Patent No.: US 7,980,523 B2
(45) Date of Patent: Jul. 19, 2011

(54) SUSPENDED PLATFORM FOR WATER HEATERS

(75) Inventors: Virgil E. O'Neil, San Diego, CA (US); Larry D. Brown, San Diego, CA (US)

(73) Assignee: Securus, Inc., Vista, CA (US)

( * ) Notice: Subject to any disclaimer, the term of this patent is extended or adjusted under 35 U.S.C. 154(b) by 159 days.

(21) Appl. No.: 10/817,229

(22) Filed: Apr. 2, 2004

(65) Prior Publication Data
US 2004/0251800 A1    Dec. 16, 2004

Related U.S. Application Data

(60) Provisional application No. 60/460,518, filed on Apr. 3, 2003.

(51) Int. Cl.
*A47H 1/10* (2006.01)
(52) U.S. Cl. .......... 248/317; 248/346.01; 248/610; 108/42; 211/113
(58) Field of Classification Search .......... 248/317, 248/610, 346.01, 346.02, 581, 328, 333; 182/113; 312/245; 108/182, 42, 107, 187; 211/113, 117
See application file for complete search history.

(56) References Cited

U.S. PATENT DOCUMENTS

| 2,316,463 | A | * | 4/1943 | Skulina ................. 119/57.8 |
| 2,901,016 | A | * | 8/1959 | Wilbricht ................. 383/12 |
| 2,947,585 | A | * | 8/1960 | Fazio ................. 108/44 |
| 2,974,994 | A | * | 3/1961 | Goldsmith ................. 294/67.1 |
| 3,239,104 | A | * | 3/1966 | Scholle ................. 222/81 |
| 4,032,102 | A | * | 6/1977 | Wolf et al. ................. 248/318 |
| D250,376 | S | * | 11/1978 | Schoenbrun ................. D6/513 |
| 4,127,252 | A | * | 11/1978 | Splawn ................. 248/333 |
| 4,201,307 | A | * | 5/1980 | Malloy ................. 220/62 |
| 4,316,545 | A | * | 2/1982 | Hartnell ................. 211/70.6 |
| 4,815,563 | A | * | 3/1989 | Puccinelli et al. ................. 182/150 |
| 5,143,178 | A | * | 9/1992 | Latham, Jr. ................. 184/106 |
| 5,507,237 | A | * | 4/1996 | Barrow et al. ................. 108/55.1 |
| 5,746,405 | A | * | 5/1998 | Dvorak et al. ................. 248/146 |
| 6,311,626 | B1 | * | 11/2001 | Roberts ................. 108/42 |
| 6,758,010 | B2 | * | 7/2004 | Wright ................. 47/67 |
| 6,851,376 | B2 | * | 2/2005 | D'Agostino ................. 108/42 |

* cited by examiner

*Primary Examiner* — Anita M King
(74) *Attorney, Agent, or Firm* — Stetina Brunda Garred & Brucker; Lowell Anderson

(57) ABSTRACT

A method and apparatus are provided for suspending an appliance from a plurality of support members which depend from overhead beams and structures of a building. A lower frame has a base with side walls extending from the base and joined to form a fluid tight container. The base has sufficient strength to support the appliance thereon when the lower frame is suspended from the support members and all the weight of the appliance is carried by the base. At least three connectors are provided, each fastened to at least one of the side walls and base. Each connector removably fastens to a different one of the support members. An upper frame can be fastened to the depending support members to further stabilize the frame. Straps can encircle the appliance to stabilize the appliance on the frame.

26 Claims, 13 Drawing Sheets

SUSPENDED PLATFORM FOR WATER HEATERS

CROSS-REFERENCE TO RELATED APPLICATIONS

This application claims the benefit under 35 U.S.C. §119 (e) of application No. 60/460,518 filed Apr. 3, 2003, with Virgil E. O'Neil and Larry D. Brown as inventors, the complete contents of which is hereby incorporated by reference

BACKGROUND OF THE INVENTION

Some indoor appliances, such as water heaters, solar storage tanks, or boilers, take up space but do not require ongoing or frequent access. Where space is at a premium, particularly in high-ceiling commercial buildings, it may be desirable to take advantage of space overhead by suspending such appliances from overhead beams or rafters.

Until now, makeshift approaches have been used to accomplish this, with significant time spent fabricating components on the scene and the resulting installation being far from uniform. Plywood sheets have been fastened to rods extending from the building ceiling, with a thin pan placed on the plywood and the appliance placed in the pan. Sometimes crossed metal beams or straps are fastened to rods with a pan placed on the beams or straps and the appliance placed in the pan so the beams or straps support the weight of the appliance. These arrangements are unstable and makeshift. The installations make it difficult to ensure consistent compliance with building regulations and the installations are time-consuming and expensive. There is thus a need for a way to support such appliances that is consistent and mechanically stable, that is adaptable to a variety of appliances and mounting situations, that provides features desirable for the end users, and that provides features for those installing these appliances.

BRIEF SUMMARY OF THE INVENTION

A suspended platform is provide for suspending an appliance from a plurality of support members which depend from overhead beams and structures of a building. The support members preferably comprise threaded rods arranged in a rectangular configuration, although as few as three such support members may be used, forming a triangle. A lower frame is fastened to the rods. The lower frame has a base with side walls extending from the base and joined to form a fluid tight container. The base has sufficient strength to support the appliance thereon when the lower frame is suspended from the support members and the weight of the appliance is carried only by the base. The prior art drip pans were so thin that they could not support this weight. At least three connectors are fastened to at least one of the side walls and base. Each connector is configured to removably fasten to a different one of the support members. When the rods are threaded, the connection between the rods and connectors is also preferably achieved by threaded connections such as nuts and washers. The base can be circular, rectangular, or other shapes, but is advantageously square with a connector at each corner.

The connectors preferably have two flanges, each fastened to a different adjacent sidewall at the corners of the base. Preferably the connectors each have a plate extending over the base, with the plate having a hole sized to allow passage of one of the depending support members, and with nuts on opposing sides of each plate to fasten the plate (and lower platform) to the support member or rod. Thus an upper nut threadingly engages the rod above the plate and a lower nut threadingly engaging the rod below the plate to position the connector between the nuts.

In a further embodiment, the connectors likewise have two flanges, each fastened to a different adjacent sidewall at the corners of the base, but with each connector further comprising a tubular portion at the juncture of the two flanges such that the longitudinal axis of this tubular portion is parallel to the line of intersection of the two adjacent sidewalls. This tubular portion of the connector thus advantageously presents an aperture sized to allow the passage of one of the depending support members or rods, with nuts placed on opposing ends of the tubular portion to fasten the connector and lower platform to the support member or rod. In yet further embodiments, the function of the connectors may be fulfilled by using welding or other fastening techniques to attach formed tubes, lugs, or other devices at the corners of the lower platform, either inside or outside of the sidewalls, to provide attachment apertures for the support members or rods.

To strengthen the support platform, two diagonal brace members extend between and are fastened to diagonally opposed support members above the location of the appliance and above the lower support frame. The brace members can be fastened to the appliance to further strengthen and/or stabilize the assembly. To further stabilize the appliance at least one strap can be used to fasten the appliance to the suspended platform. The strap has opposing distal ends each of which is configured to fasten to a different one of the depending support members. Fixed or adjustable length ties can be fastened to one of the lower platform or depending support members to further stabilize the platform.

There is also advantageously provided a kit for suspending an appliance from a plurality of support members which depend from overhead beams and structures of a building. The kit includes a lower frame having a base with side walls extending from the base and joined to form a fluid tight container. The base has sufficient strength to support the appliance thereon when the lower frame is suspended from the support members so the entire weight of the appliance is carried only by the base. At least three connectors are provided, each fastened to at least one of the side walls and base. Each connector is configured to removably fasten to a different one of the support members.

In further embodiments of this kit, the lower frame is a rectangle with the connectors located at each corner of the rectangle. An upper frame can also be optionally provided. The upper frame can comprise two diagonal braces each of which fastens to diagonally opposing support members. The upper frame can also include a frame with four sides with or without the diagonal members. The upper frame and diagonal members can have openings through which the depending support members can pass in order to make it easier to fasten the upper frame and diagonal members to the depending supports. The kit can also optionally include at least one strap having opposing distal ends each of which is configured to fasten to a different one of the depending support members to stabilize the appliance. Further, the kit can include at least two fixed or adjustable length ties each having one end configured to fasten to one of the lower platform or depending support members. When the support members are threaded rods, then the kit advantageously also includes a plurality of threaded fasteners sized to fasten a plurality of the connectors to the depending threaded support rods.

There is also provided a method of suspending an appliance from a building having an overhead support. The method includes depending at least three support members from the overhead support. A lower frame is provided that has sidewalls and a base and at least three connectors joined to form a waterproof container. The base has sufficient strength to support the appliance when the frame is suspended from the connectors and the weight of the appliance is carried entirely by the base. The method also includes fastening each of the connectors to a different one of the depending support members and adjusting the position of the lower frame relative to the depending supports to level the lower frame. The appliance is then placed on the base.

In further embodiments the method includes providing four depending supports arranged in a rectangle. The lower frame is then also advantageously formed in the shape of a rectangle and with the connectors located at the corners of the rectangle. In further embodiments a brace member is fastened to diagonally opposing depending supports. The method also includes fastening the brace member to the appliance. The method also optionally includes fastening a strap to two depending support members, with the strap encircling at least half of the appliance, stabilizing the apparatus on the suspended platform. When the depending support members comprise threaded rods, the method includes adjustably fastening the lower frame to the depending support members by threaded fasteners connected to each rod.

BRIEF DESCRIPTION OF THE DRAWINGS

These and other advantages and features of the invention will be better understood by reference to the following drawing in which like parts are give like numbers throughout, and in which.

DETAILED DESCRIPTION OF THE INVENTION

Figure 3:
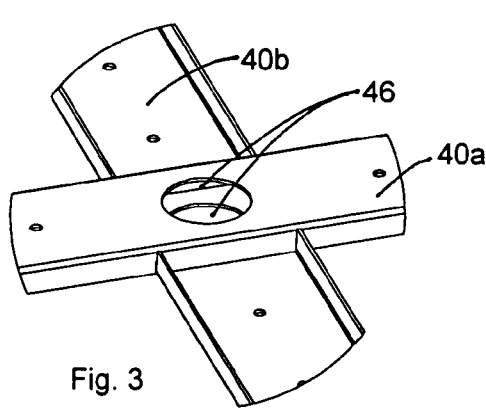
FIG. 3 is a perspective view of a connection detail taken along 3-3 of FIG. 1.
Figure 2:
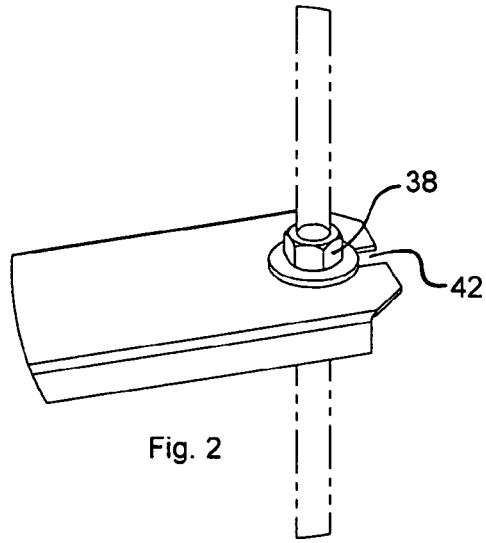
FIG. 2 is a perspective view of a connection detail taken along 2-2 of FIG. 1.

Referring to FIGS. 1-11, an indoor appliance 20, such as a water heater, solar storage tank, or boiler is held on a suspended platform 22. Various appliances may be held and the following description uses a water heater to illustrate the platform construction and advantages, but this use is for illustration and is not to be construed as limiting the invention. The suspended platform 22 comprises a platform or base 24 on which the weight of the water heater 20 rests. Connectors 26 are placed at various locations on the base 24 to suspend the base from a plurality of depending supports 28 such as rods or cables. Typically threaded rods are fastened to overhead beams such as ceiling joists and depend toward the floor, and these are preferred for use with the suspended platform 22. Such threaded rods are commonly used in construction for hanging ducting, pipes, and other utilities inside a building. It is preferred that the base 24 have a rectangular shape with a connector 26 placed at each corner of the square base, and fastening to a rod 28 at each corner. Advantageously the base 24 and connector 26 are made of metal. As used herein, a rectangular shape includes a square, and the base 24 is preferably square.

Because three points define a plane, it is ideal to use only three rods 28 and three connectors 26. But by using four rods 28, then in the unlikely event that one rod 28 breaks or becomes disconnected, there are still three rods to define a plane and to provide a greater chance that the base 24 will not flip over and dump the water heater 20 on the ground. Thus, while three supports 28 are ideal, four (or more) are preferred.

One concern regarding water storage devices and other appliances 20 is the potential for leakage, especially when located where not readily inspectable. The base 24 is thus preferably designed with an upper surface shaped to retain leaking liquid. A box-shaped structure formed by sidewalls 30 and base 24 is believed suitable. In the illustrated embodiment the side walls 30 are perpendicular to the plane of the base 24 with each connector 26 joining each of two adjacent side walls 30 but the side walls could be inclined. A base 24 about 24-30 inches on a side, with side walls 30 about 2-4 inches high is believed suitable, but the size will vary with the size of the appliance 20. The base 24 is advantageously made of galvanized steel, but could be of molded plastic. The connector 26 is preferably made of metal if it is bolted onto the base 24 and side walls 30, but various other materials can be used if they are strong enough to support the intended load exerted by appliance 20. Further, the functions of the connector 26 can be integrated into one or both of the base 24 or side walls 30, for example by forming, welding or molding the required features into the base 24 or the side walls 30.

To ensure fluids leaked from the appliance 20 are captured, the corners of the box are preferably made watertight. This is achieved by forming the base 24 and walls 30 integrally, as with a molded plastic platform or extruded or spun metal platform forming a shallow cylinder, or a steel platform with a welded corner seams, or by application of caulk or other sealant to the corners or to any other locations that may leak. Advantageously, the base 24, walls 30 and connectors 26 are all integrally formed. If made of formed metal, the seams or joints could be welded and plated after welding. When the corners are bolted together as described later it is advantageous to apply a sealant to the threaded connections and to the joints where needed to be leak proof. To the extent possible this sealing is preferably done at the time of manufacture rather than in the field at the time of or after installation.

A drain opening 31 is preferably, but optionally, added so a pipe can be attached, adjacent to the bottom of the base 24. A drain 32 is thus preferably, but optionally, provided on one of the base 24 or a side wall 30, and penetrating either the sidewall or the bottom of the base. The illustrated embodiment shows the drain 32 on the side wall 30. Advantageously, the drain 32 comprises a tube fastened to the base or side wall 30 by various ways, including threaded fasteners, clamps, welding, or adhesives. The drain 32 is preferably, but optionally, adapted to connect to a fluid fitting or tube, such as a drain pipe, or a garden hose. A threaded fitting on the drain is thus preferred, but a variety of connectors are known to those skilled in the art and could be used given the disclosures herein.

The base 24, side walls 30 and connectors 26 (if present), form a first, lower frame 39 on which the appliance 20 rests. The base 24 must be strong enough the support the weight of the appliance 20. A metal base 24 of about 12 gauge (0.108 inches) thickness is believed suitable. The lower frame 39 can be fastened to the rods 28 in a variety of ways, but is preferably adjustably mounted. When the supports 28 take the form of threaded rods then washers and threaded fasteners can be used to adjustably position the lower base 24 or frame 39 while fastening it to the support rods 28.

Figure 7:
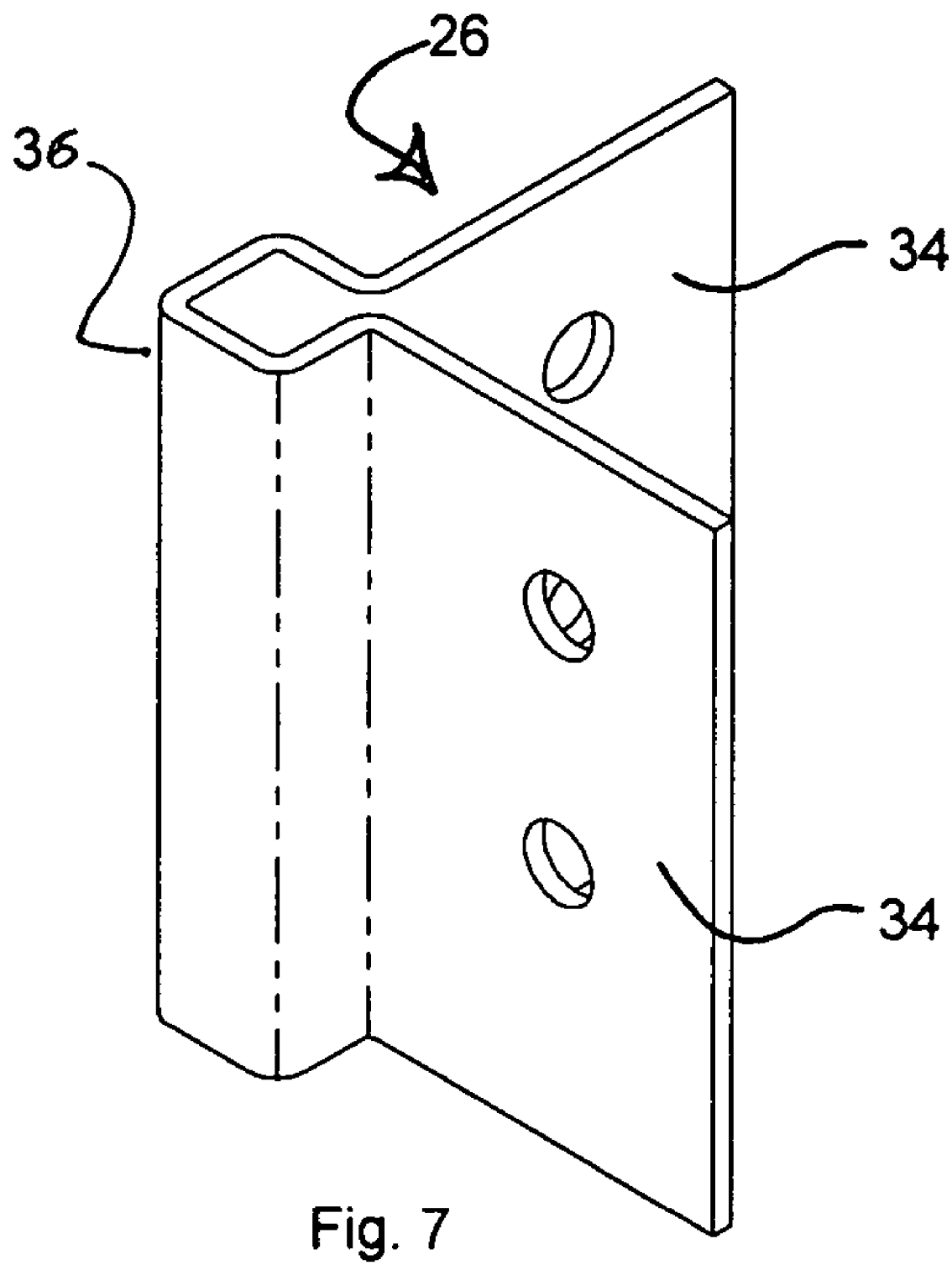
FIG. 7 is a perspective view of a corner fitting used on the base of FIGS. 1 and 5.
Figure 8:
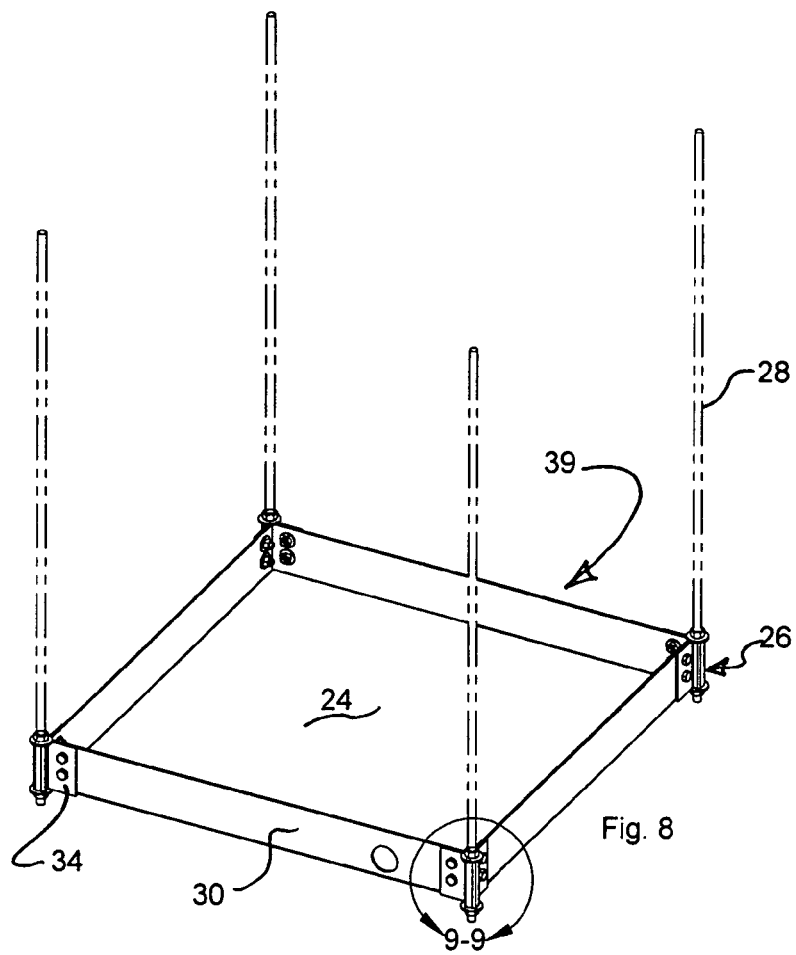
FIG. 8 is a perspective view of the base of FIG. 5 suspended.
Figure 9:
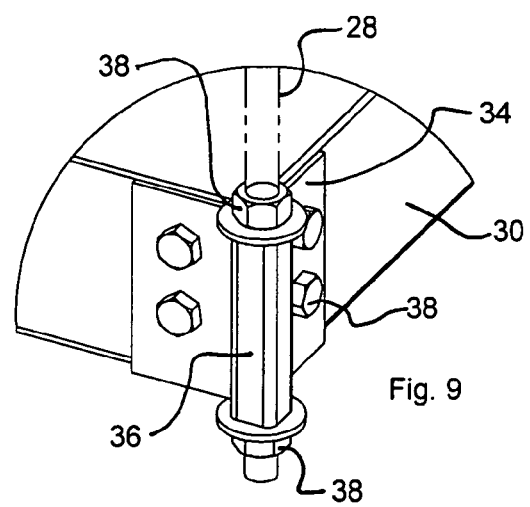
FIG. 9 is a perspective view of a corner of the base taken along 9-9 of FIG. 8.

Preferably, but optionally, a connector 26 is shown in FIGS. 7 and 9 which provides adjustment ability, and which strengthens the corners of the suspended platform 22 so more weight can be supported. The connectors 26 are desired, but the support or suspension members 28 could fasten directly to the base 24 or other portions of the frame 39. The connector 26 has flanges 34 for fastening to and joining adjacent side walls 30. The flanges 34 are shown with holes in them for threaded fasteners such as bolts, but other fastening mechanisms could be used, including engaging projections and recesses, welding, soldering, rivets, adhesives, etc. The flanges 34 join at a corner to form a closed or open tubular structure 36 large enough so the support 28, such as ⅜ or ½ inch diameter threaded rods, can pass through and be contained within the tubular structure 36. Advantageously the tubular structure 36 extends along the height of the side walls 30, but it could be shorter, or longer. A fastener 38, such as threaded fastener or nut can be threaded onto the rod 28. By turning the fastener 38, the position of the connector 28 relative to the rod 28 can be varied, and that allows adjusting the location and orientation of the base 28. Washers are used as desired in these threaded connections. Other fasteners 38 could be used, including pins or clamps. Advantageously two fasteners 38 can be used to fix the position of the connector 28 relative to the rod 28 which the fasteners threadingly engage. Thus, an upper fastener 38 and a lower fastener 38 can each threadingly engage the rod 28 on opposing sides of the connector 28, and preferably abutting the connector 28 so they can be tightened toward each other to lock the connector in position.

As shown in FIG. 9, by placing a fastener 38 on opposing ends of the connector 26, the position of the connector can be restrained from moving along the length of the rod 28 in either direction. If a flexible cable is used for support 28, the cable can be knotted, tied, clamped or otherwise fastened to the base 24 or frame 39, or fastened to another object to form an obstruction too large to pull through the opening formed by tube 36 in the connector 26 or base 24 or sidewalls 30. The advantage of using threaded fasteners 38 and threaded rods 28 is that both large and fine position adjustment can be readily achieved by positioning the fasteners 38.

The fasteners 38 and suspended supports 28 cooperating with connectors 26 provide attachment means that allow the suspension members 28 to be attached to the lower frame 39, and which preferably allow the position of each attachment point to be adjusted independently for leveling, e.g., by turning a threaded nut. Preferably, the attachment means are brackets 20 with holes that allow the suspension members 28 to pass through the brackets, although the attachment means could also be integral features, such as with a one-piece molded plastic platform or welded box-frame.

Figure 4:
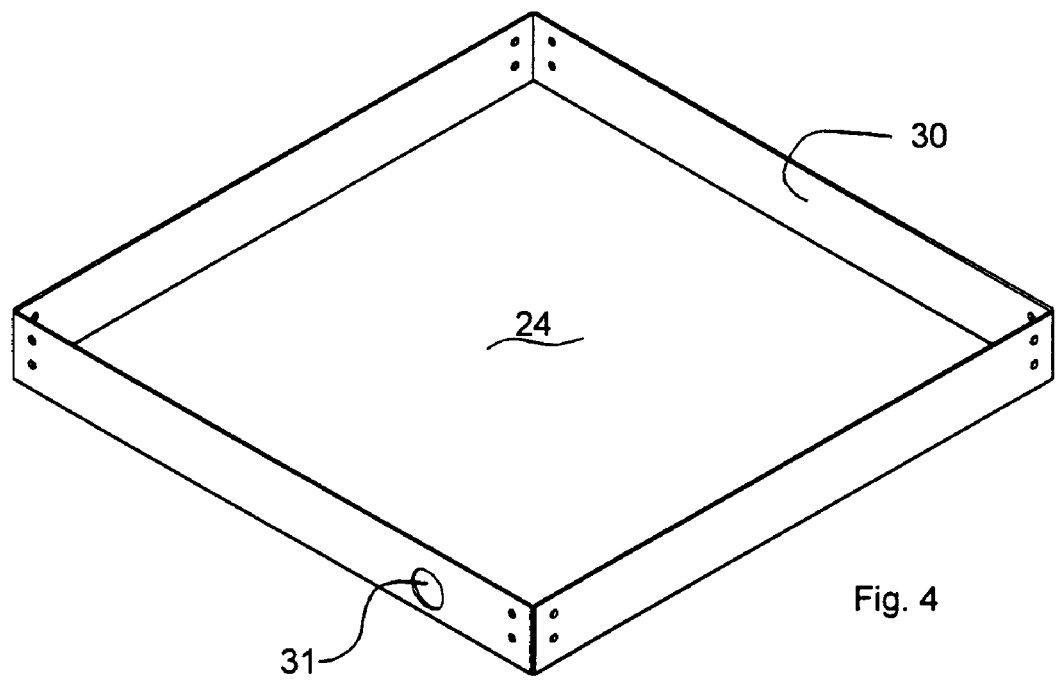
FIG. 4 is a perspective view of a base used in FIG. 1 before assembly.
Figure 5:
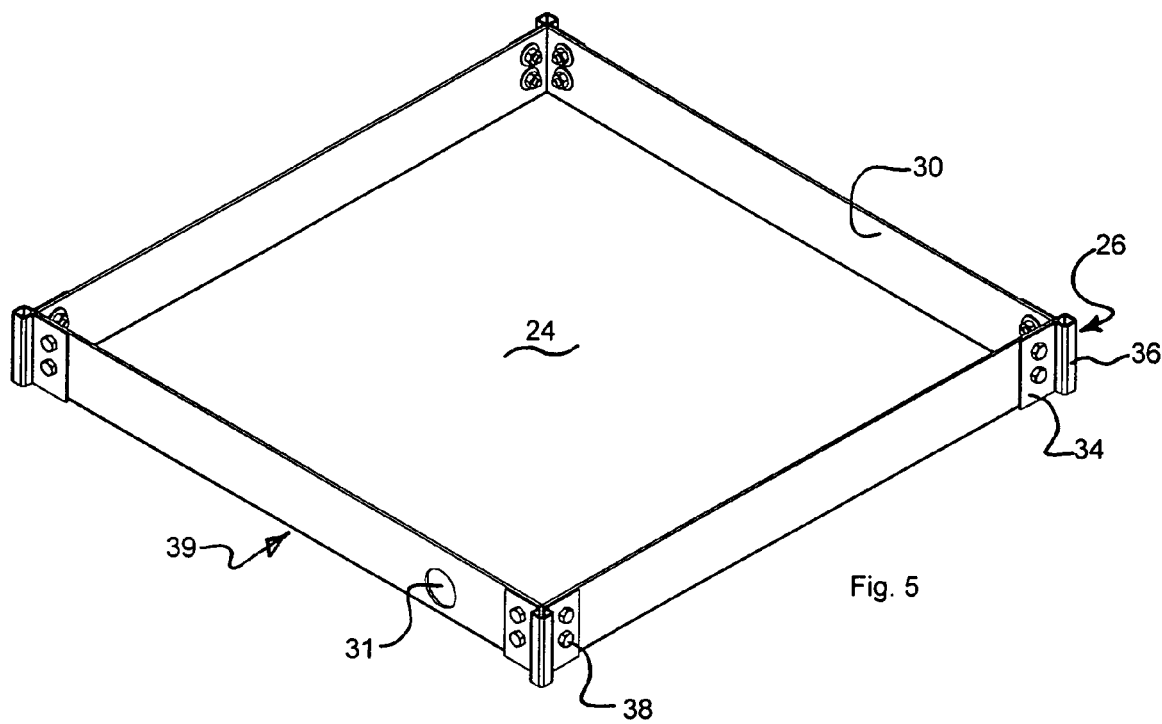
FIG. 5 is a perspective view of the base used in FIG. 4 with corner fittings.
Figure 6:
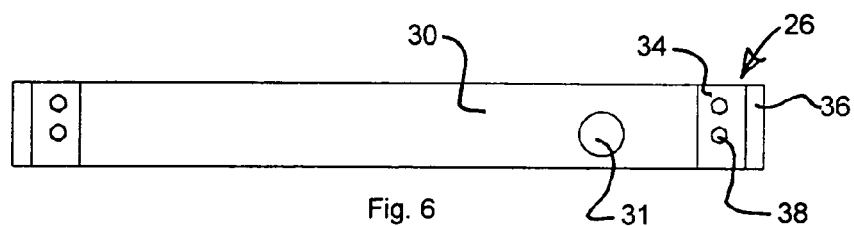
FIG. 6 is a side view of the base of FIG. 5.

Referring to FIGS. 4-5, the base 24 and side walls 30 may be formed of a single sheet of flat material, preferably metal. The distal ends of side walls 30 may have holes for the fasteners punched or cut, and the opening for the drain 32 may likewise be cut or punched, preferably while the sheet is flat. The side walls 30 are then bent perpendicular to the planar base 24. The connectors 26 are then fastened to at least one of the side walls 30 and base 24, to form the bottom frame 39. Sealant is applied as needed, or the edges of the sidewalls 30 may be welded or otherwise joined to be made water tight.

Stability is a concern with the installation as described to this point. The appliance 20 or base 24 may be secured to nearby surfaces using additional cables and hardware attached at the periphery of the bottom frame 39 for a basic degree of stability. However, for seismic concerns, it is preferable to unitize the appliance 20 to the lower platform 39, even with supplementary anchors as described above. To help accomplish this, an additional brace device is first installed above the appliance 20, attached to the suspension members 28, and tightened down against the appliance 20 using hardware, which in the illustrated embodiment comprise threaded fasteners. This brace preferably crosses the upper surface of the appliance 20, forming a mechanically rigid assembly with diagonal pairs of suspension members, although the brace could take a shape more specific to the appliance.

Referring to FIGS. 1-3 and 10-11, the brace mechanism is described in more detail. The suspension devices such as rods 28 are preferably, but optionally, braced relative to each other and relative to the suspended apparatus 20. This bracing is achieved in the first illustrated embodiment by two diagonal brace members 40a, 40b, which connect to diagonally opposing rods 28. The diagonal brace members 40 are shown as connecting to diagonally opposing rods 28, but other arrangements could be used, especially as the number of rods 28 could vary. The diagonal brace members 40 can have holes in them to allow the brace members to slide along suspension members 28 and be restrained in the plane of the member 40. Alternatively, the distal ends of the brace members 40 can have a slot 42 extending into the member with the slot sized and orientated to receive the rod 28. The slot 42 allows the brace members 40 to be attached easier.

Advantageously the brace members 40 are fastened to the supports 28 so they cannot move along the length of the support 28 or off the support 28 to readily position the braces during installation. When the support 28 comprises a threaded rod then a threaded nut 38 can be used to locate the brace member 40 on the threaded rod 28. By using two nuts 38 on opposing sides of the brace member 40 to squeeze the member 40 between the nuts, the member can be locked into place. Various ways of fastening the brace member to the supports 28 can be used, including welding, adhesives, clamps, pins, and other fastening mechanisms known to those skilled in the art.

Figure 1:
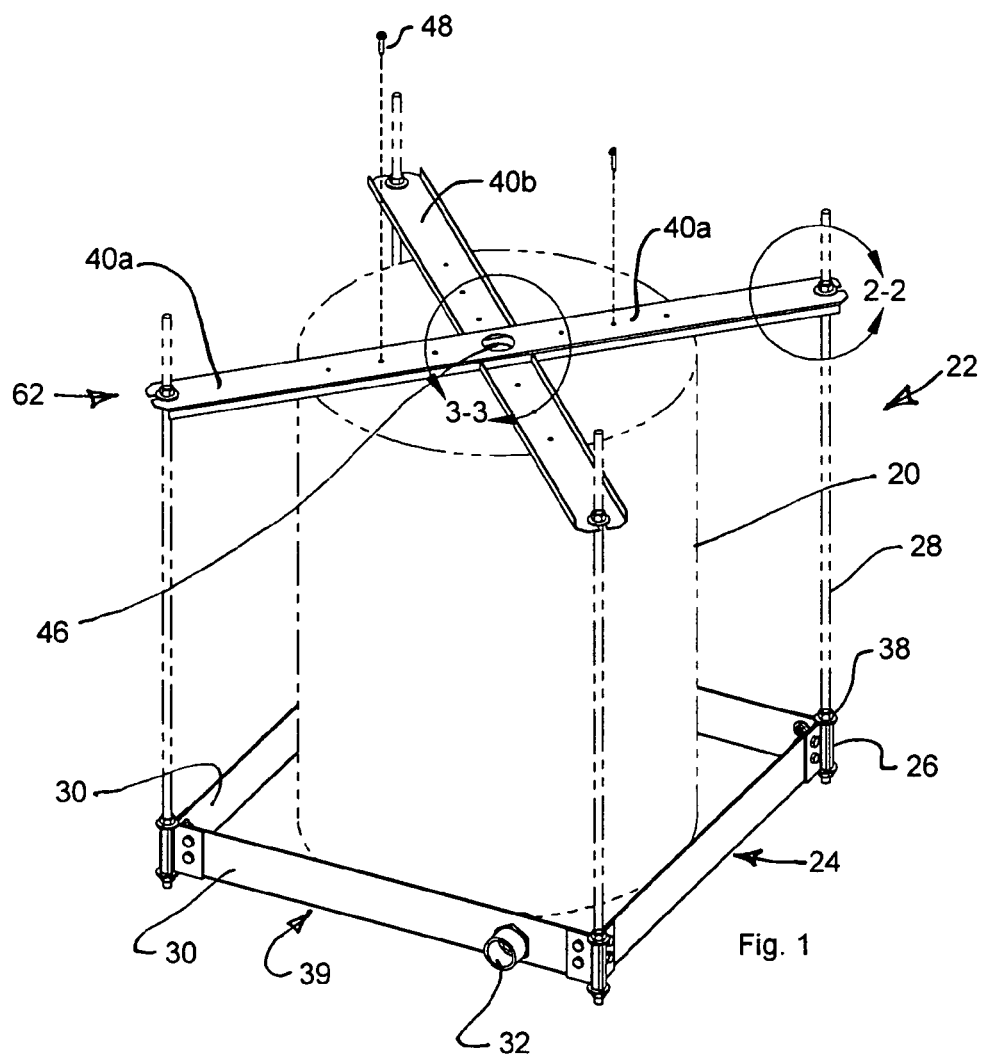
FIG. 1 is a perspective view of a suspended platform.
Figure 10:
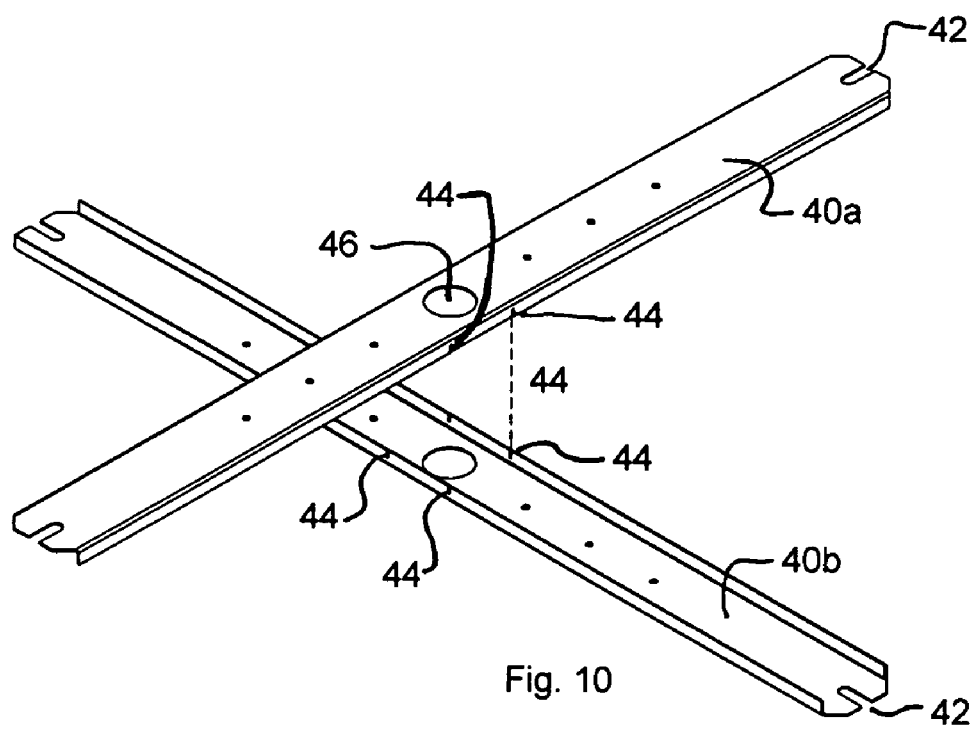
FIG. 10 is a perspective view of an unassembled brace used on the platform of FIG. 1.
Figure 11:
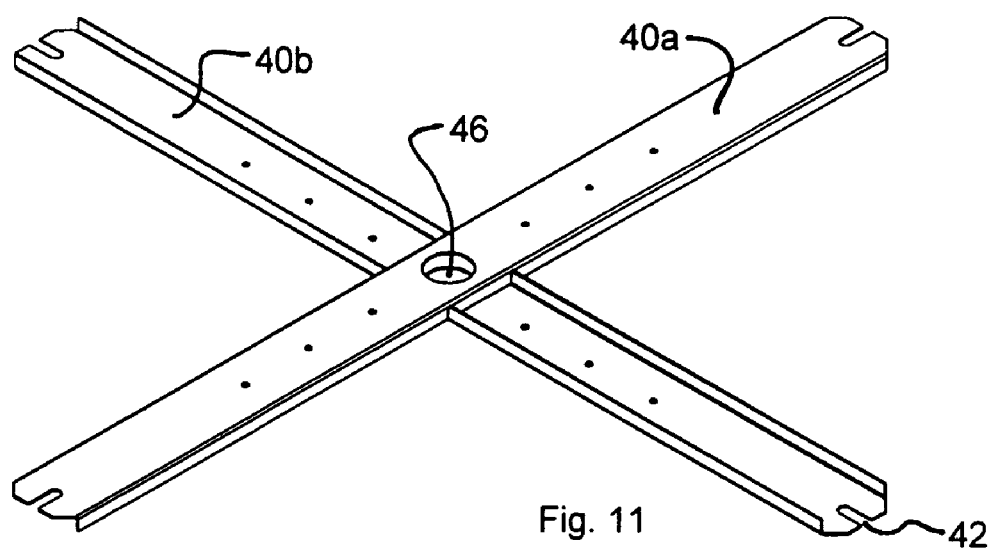
FIG. 11 is a perspective view of the brace of FIG. 10 in an assembled configuration.
Figure 12:
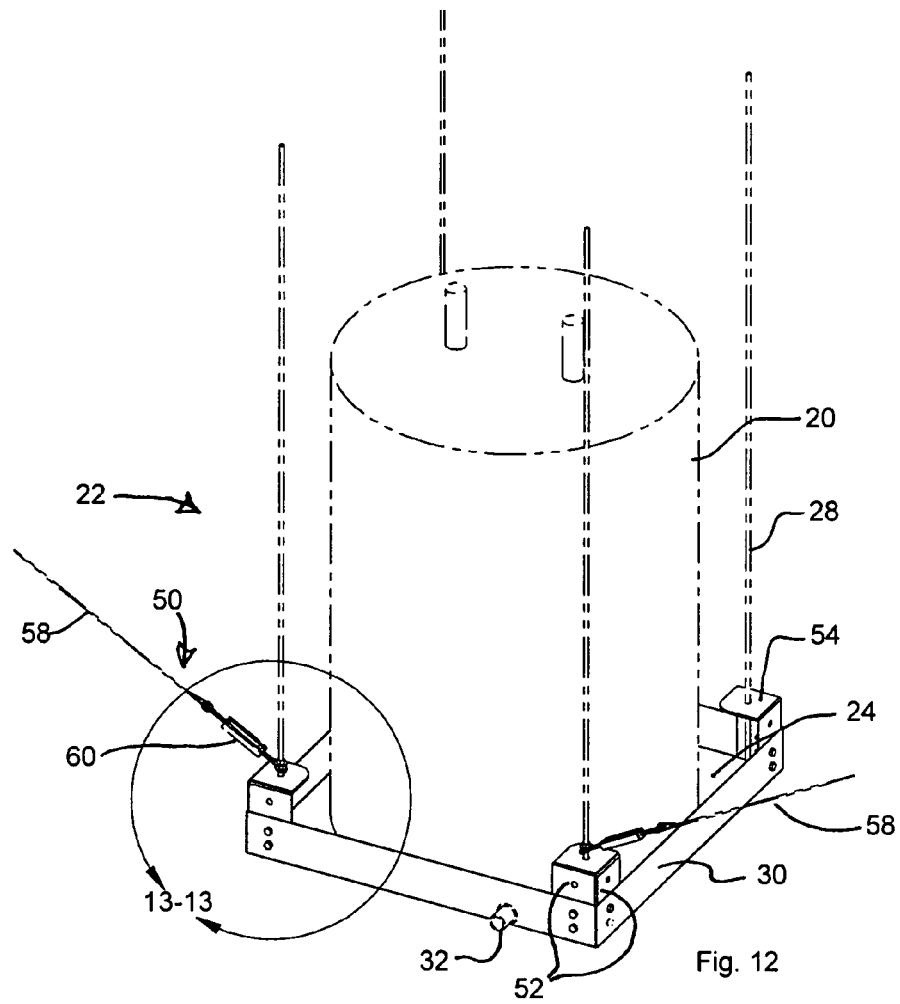
FIG. 12 is a perspective view of an alternative embodiment of a base.
Figure 13:
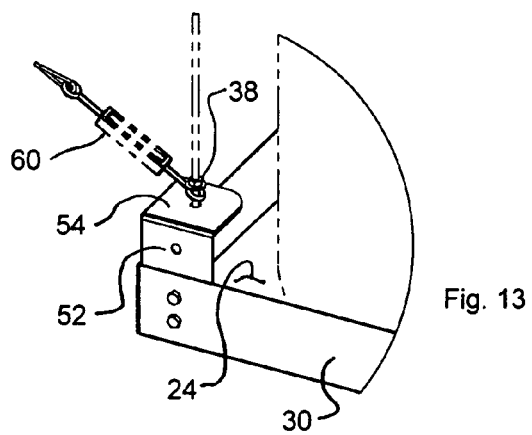
FIG. 13 is a perspective view of a corner connector on the base of FIG. 12, taken along 13-13 of FIG. 12.
Figure 14:
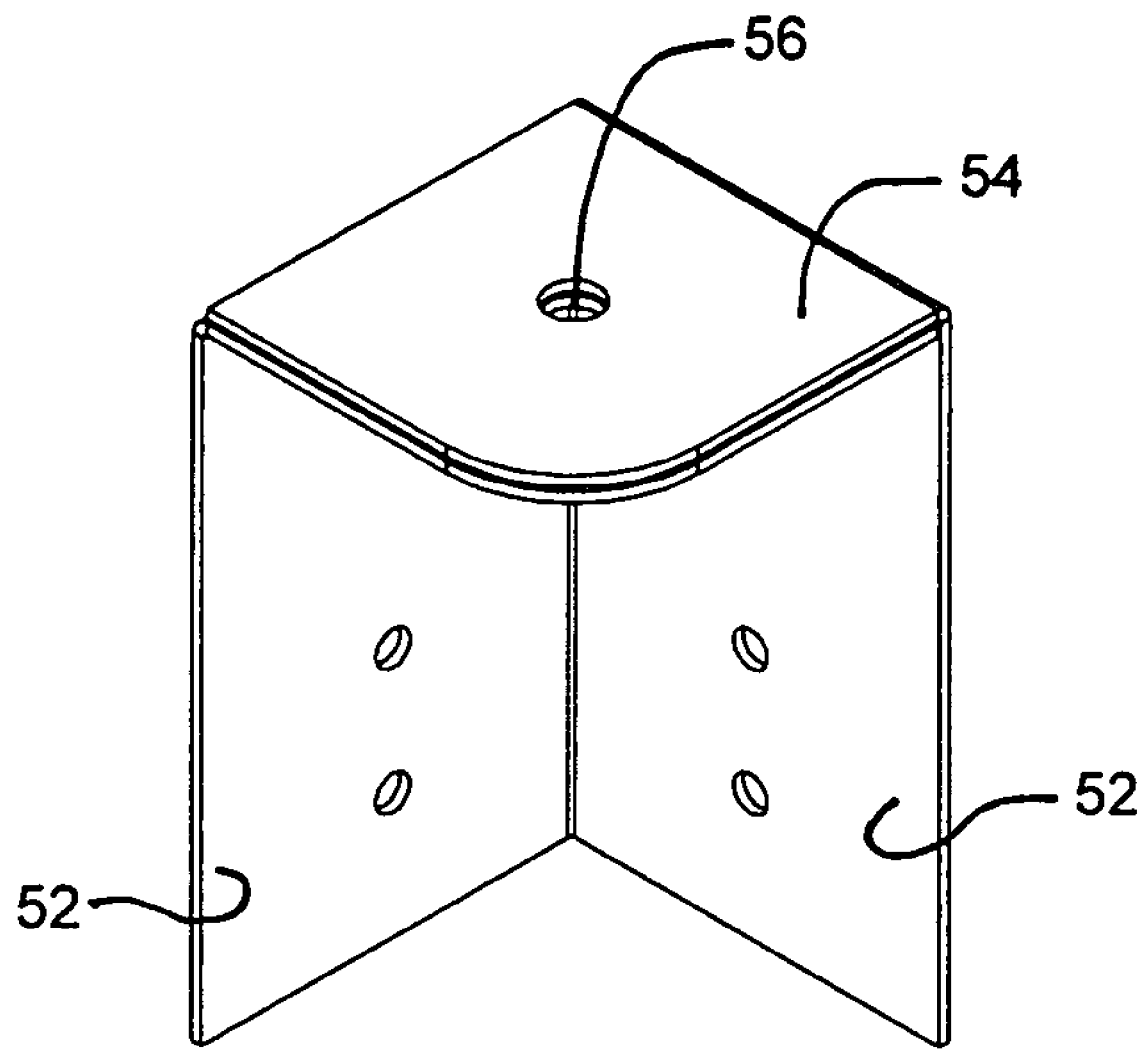
FIG. 14 is a perspective view of the corner connector shown in FIG. 12.

As seen best in FIGS. 1 and 10-11, the brace members 40 are advantageously formed of bent or extruded sheet metal or extruded plastic, having a back section and short legs extending therefrom, preferably extending perpendicularly. This forms a U shaped cross section, with short legs on the U. The brace members 40 advantageously have mating alignment slots cut near the center of each brace member, so the slots in opposing members 40 can be aligned and interlocked. This allows the two members 40a, 40b to be interlocked in an X or cross shaped arrangement. Other ways of connecting the bracing members 40 are known to those skilled in the art and may be used, including threaded fasteners, adhesives, welding, clamp brackets, etc.

Depending on the nature of the appliance 20 being supported on the suspended platform 22, one or more holes 46 may be formed in the brace members 40. For the depicted water heater 20 a hole 46 is provided to allow passage of a temperature/pressure relief valve, or other connection at the center of the heater 20. This also helps connect the brace members 40 to the water heater 20.

Advantageously, but optionally, the brace members 40 are fastened to the water heater 20. Encircling a portion of the water heater 20, as by the holes 46 in the brace members 40, is one way to fasten the water heater to the brace members. Alternatively, threaded fasteners 48 can be screwed through one of the brace members 40 into the top of the water heater 20 to fasten the parts together. Care must be taken so the fasteners 48 do not damage the water heater 20. The brace members 40 advantageously form a portion of or all of a top frame 62.

The use of the suspended platform 22 is described using FIG. 1. The threaded rods 28 are extended from the overhead support (not shown) a desired distance. The base 24 is then placed at the desired location by passing the threaded rods 28 through the appropriate portion of connectors 26. The nuts 38 are used to adjust the position of the base 24, and then the nuts 38 are tightened to fix the position of the base relative to the support rods 28. At least two of the rods are advantageously spaced a distance apart sufficient to allow the water heater 20 to be placed between the adjacent rods and onto the base 24. If not, appliance 20 and lower frame 39 must be supported while the frame 39 is fastened to the rods 28. With the platform 24 suspended from suitably anchored suspension members 28 of the proper length, and constructed as described above, the water heater or other appliance 20 may be lifted and set into the platform box formed by base 24 and connected walls 30, and, typically, plumbed into the building water system. The top brace 40 is then fastened to the rods 28 using nuts 38, with the holes 46 fitting over the temperature/pressure relief valve of the water heater 20 as desired. Screws 48 are than used to further fasten the water hater 20 to the brace members 40.

The top diagonal braces 40 or (frame 62 described later) are optional. But adding the top braces 40 makes the suspended platform 22 more stable. When the top diagonal brace members 40 are used the suspended platform 22 includes the support members 28 between the brace members 40 and the base 24. These parts cooperate to enclose the water heater 20 in an enclosing frame that is suspended from the lower frame 39, and the members 28 form part of the support and part of the frame.

A further embodiment of the suspended platform 22 is shown in FIG. 12-19. A base 24 having side walls 30 is suspended from supports 28 that advantageously take the form of threaded rods. The connector 26 takes the form of a flange to which the support 28 fastens, and bracing ties 50 are provided.

The connector 26 of this embodiment is similar to a piece of angle iron with the end closed. Two flanges 52 are at right angles to each other so they can be fastened to adjacent ends of the side walls 30 at the corner. A top flange 54 is fastened to both side flanges 52, with each of the side flanges 52 and the top flange 54 being in a different, orthogonal plane. The side flanges 54 can have holes in them so they can bolt to the side walls 30, but could be fastened by welding, clamps, bonding, or other ways known to those skilled in the art. The top flange 54 also advantageously has a hole 56 into which the threaded rod 28 extends. A nut 38 engaging the rod 28 on each opposing surface of the top flange 54 can lock the flange in position relative to the threaded rod 28. If the support 28 is not a threaded rod, the hole 56 can be used with different connecting mechanisms, or a different shaped connector or fitting could be provided.

Figure 18:
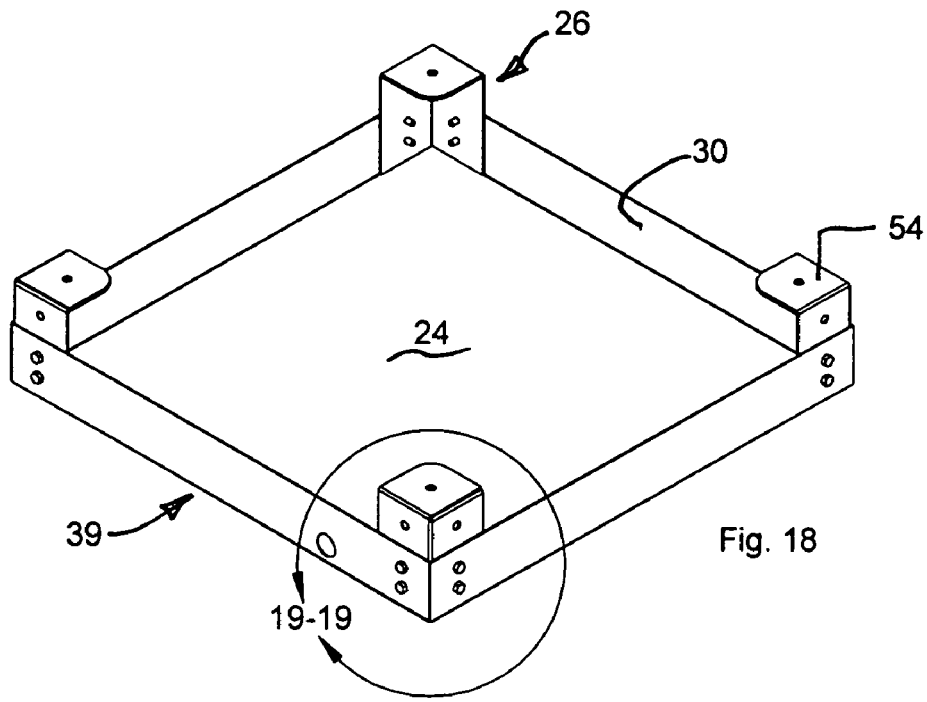
FIG. 18 is a perspective view of the base of used on the platform of FIG. 12.
Figure 19:
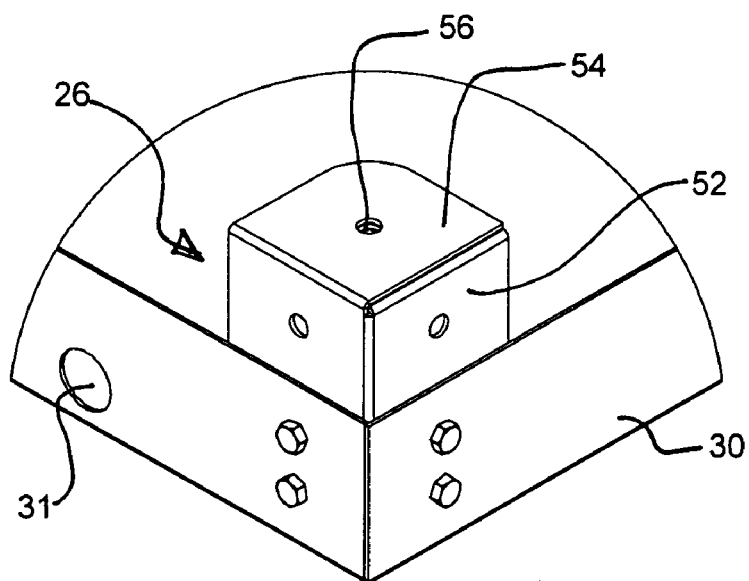
FIG. 19 is a perspective view of a corner of the base of FIG. 18, taken along 18-18 of FIG. 18.

The connector 26 shown in FIGS. 18-19 is advantageously made of a flat sheet of metal, with the side flanges 52 being bent perpendicular to each other and to the top flange 54 after the holes are punched or cut or otherwise formed in side flanges 52 and after hole 56 is formed in top flange 54. The connector 26 is shown as bolted to the side walls 30, but it could be welded, bonded, or fastened by other mechanisms known to those skilled in the art. The base 32, side walls 30 and connectors 26 again form a lower frame 39, with the connectors being fastened to at least one of the base or side walls.

Advantageously two or more ties 50 connect to one of the connector 26, side walls 30, base 24 or support 28. The tie 50 advantageously comprises a cable 58 fastened to an eyelet of a turnbuckle 60. The turnbuckle 60 could be fastened to the connector 26 by using a hook or fastening to a hole or portion of the connector 26. Advantageously, however, the turnbuckle has an eyelet through which the rod 28 extends, with a nut 38 and washer trapping the eyelet between the nut and the connector 26. The ties 50 preferably fasten to or near to two opposing sides of the lower frame 39 so stabilize the frame 39 from swinging and/or twisting. The ties 50 have one end fastened to a support structure (not shown) and the other end fastened to one of the connector 26, side wall 30 or base 24 or support 28. The turnbuckle 60 allows tightening the tension in the cable 58 to stabilize the support platform 22.

Figure 17:
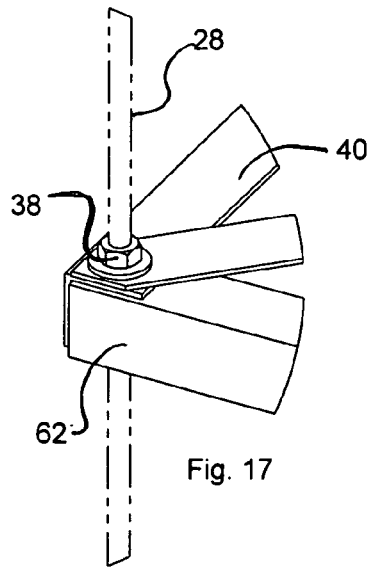
FIG. 17 is a perspective of a connection detail taken along 17-17 of FIG. 15.
Figure 15:
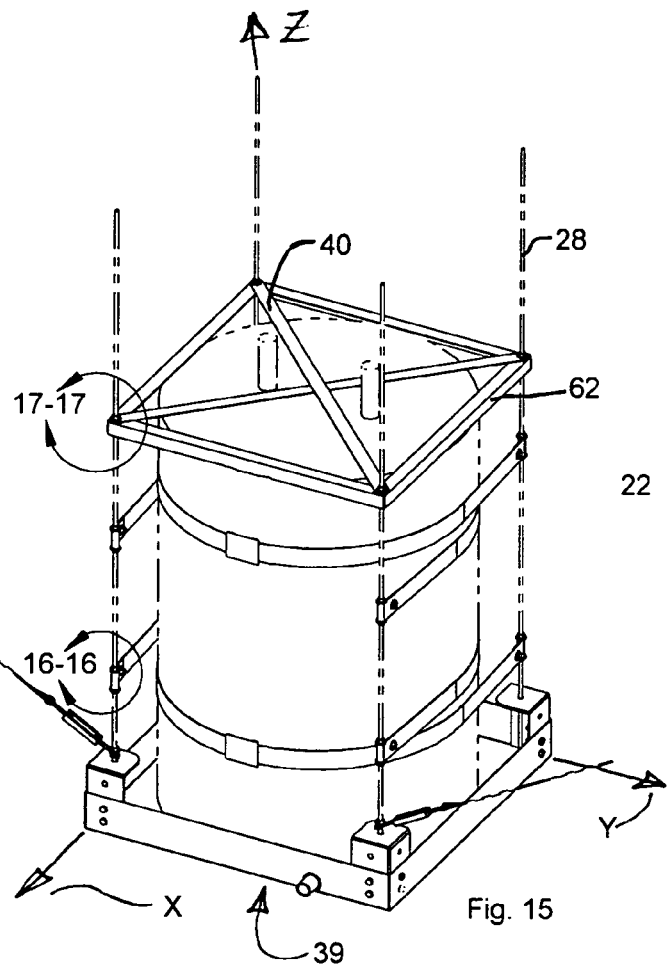
FIG. 15 is a perspective view of an alternative embodiment using the base of FIG. 12 and an alternative upper brace.
Figure 16:
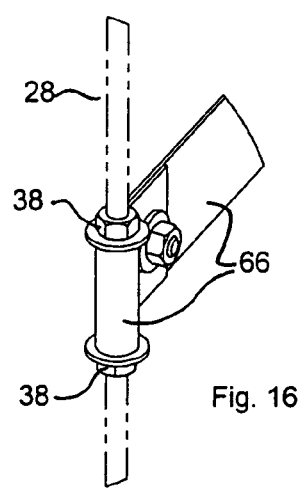
FIG. 16 is a perspective view of a connection detail taken along 16-16 of FIG. 15.

Referring to FIGS. 15 and 17 another embodiment of a top brace or top frame 62 is shown. A frame 62 having the same number of sides as there are rods 28 is formed of angle iron so the cross section of each side of the frame has two walls perpendicular to each other, one extending horizontally and one vertically. A hole (not shown) is formed in the horizontal flange or side of the frame at each corner, and the threaded rods 28 extend through each hole. Since four rods 28 are used in the illustrated embodiment the frame 62 has four sides with a rod 28 extending through each of the four corners of the frame. At each corner nuts 38 are threaded onto the rods 28 and located on opposing sides of the frame 62 along the length of the rod 28, to fasten the frame 26 to the rod.

As best seen in the detail of FIG. 17, the corners of the frame 62 are formed by overlapping two separate pieces of angle iron and bolting them together using the threaded rod 28 and nuts 38 on opposing sides of the frame 62. But the overlapping ends of the angle iron could be welded rather than freely overlapping. Welding would provide a stiffer frame 62. While described using angle iron, other metals could be used to form the frame 62, including aluminum alloys, zinc alloys and tin alloys, and the frame could be made of polymers and plastics, or it could be made of wood, as could the lower frame including base 24 and side walls 30. This rectangular or square frame 62 braces the adjacent rods 28 from moving toward or away from each other, but is weak in torsion or twisting of the support platform 22.

To reduce twisting, diagonal brace members 40 extend between each pair of diagonally opposing rods 28. In this embodiment the brace members 40 are flat strips which may or may not be joined at the middle where they cross each other. The brace members 40 have distal ends with holes through which one of the rods 28 extends, with nut 38 fastening the brace members 40 to the frame 62 and rods 28 as previously described. The slotted ends discussed relative to FIG. 1 could also be used here and vice versa. The braces 40 can be fastened to the water heater 20 by fasteners 48 (FIG. 1) or by other means, as desired. This embodiment also shows that the diagonal brace members 40 can have various cross-sectional shapes.

When an upper support frame 62, and/or the diagonal supports 40 are (FIG. 1) used the suspended platform 22 includes the supports 28 fastened between the upper frame (frame 62 and/or diagonal supports 40) and the lower frame 39 (base 24, side walls 30, and optionally connectors 26). Thus use of both an upper and lower frame strengthens and stabilizes the suspended platform 22, and the supports 28 are held in position between those upper and lower frames to contribute to that support and stability. Fastening the upper frame 62 to the appliance 20 further strengthens the configuration.

Referring to FIGS. 15-16 and 26-27, the water heater 20 may optionally be secured against lateral motion by wrapping it with a pair of adjacent, cooperating straps 66 in at least one location relative to the vertical axis of the water heater. Preferably, each strap 66 has a means of applying adjustment and tension to the length, so that it can be pulled tight around the water heater. For some appliances like a water heater, two pairs of straps are preferably used, one pair located at some distance above the other. The ends of the first strap 66 of each pair are securely attached to adjacent suspension members 28, with the strap being looped around the appliance. The loop may only make a 180-degree pass around the appliance 20, or it may wrap completely around (1½ times). A second, cooperating strap assembly is installed immediately adjacent vertically to the first one, with the ends of this second strap being attached to the other two suspension means and the strap 66 similarly looped around the appliance 20. By moving the appliance 20 to the center of the base 24 and suitably tensioning the pair of straps 66, the appliance can be securely held in place against lateral motion along at least one axis, and preferably along two perpendicular axes.

In more detail, the straps 66 are shown as taking the form of a long strip of flat metal or cloth, but various materials can be used. Each of the two distal ends of the strap 66 is adapted to fasten to one of the supports 28 after encircling the water heater. Advantageously the straps 66 form a U, with opposing ends of the strap fastened to two adjacent rods 28.

The ends of the straps 66 are fastened to the rods 66 by any convenient way. This could comprise putting one or more holes in the ends of the straps 66 and extending the support rods 28 through the desired holes selected to achieve a desired tightness of the strap. But preferably the strap 66 is removably fastened to the rods 28. In the illustrated connection each end of the strap 66 is looped back on itself to form a loop or tube, with the distal end then fastened to the strap, preferably by a removable fastener such as a screw or bolt. The rod 28 extends through the loop, and a nut 38 and washer are threaded onto each rod 28 and located above and below the end of the strap so as to trap the strap end between the nuts. A threaded fastener such as a bolt and nut are shown as fastening the distal end of the strap to form the loop. That keeps the strap 66 fastened to the rods 28 at a fixed location on the rod. A series of holes in the strap ends can allow the length of the strap to be adjusted to achieve a desired tightness.

The support straps 66 which fasten to two adjacent straps while encircling the appliance 20 restrict the movement of the water heater 20 in only one direction, toward the closed end of the "U." Thus, the water heater of FIG. 15 is restrained from movement in both directions along the X axis. Lateral movement along the Y axis is permitted to the extent the straps 66 slide around the water heater 20 and to the extent the straps 66 bend rather than stretch. More straps 66 could be used if desired.

The rods 28 are preferably at least slightly flexible so the strap can be manually pulled to tighten the straps 66 by pulling against the rods 28. An adjustable length strap 66 can be used if desired. Various mechanisms are available to adjust the length of the straps 66, including those disclosed in U.S. Pat. No. 6,254,052, the complete contents of which are incorporated herein by reference.

If the straps 66 encircle and abut about half the water heater 22, then there are preferably two straps encircling the heater 22 from opposing directions in order to ensure the water heater does not move. Further, to avoid tipping the water heater 22, there are preferably a pair of straps 66 toward the top of the water heater 20 and another pair of straps toward the bottom of the water heater. The straps 66 thus provide means for holding the water heater 20 in a position relative to the supports 28.

Figure 25:
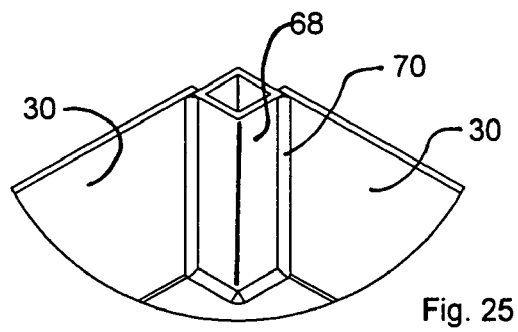
FIG. 25 is a perspective of a corner detail of the base of FIG. 23, taken along 25-25 of FIG. 23.
Figure 23:
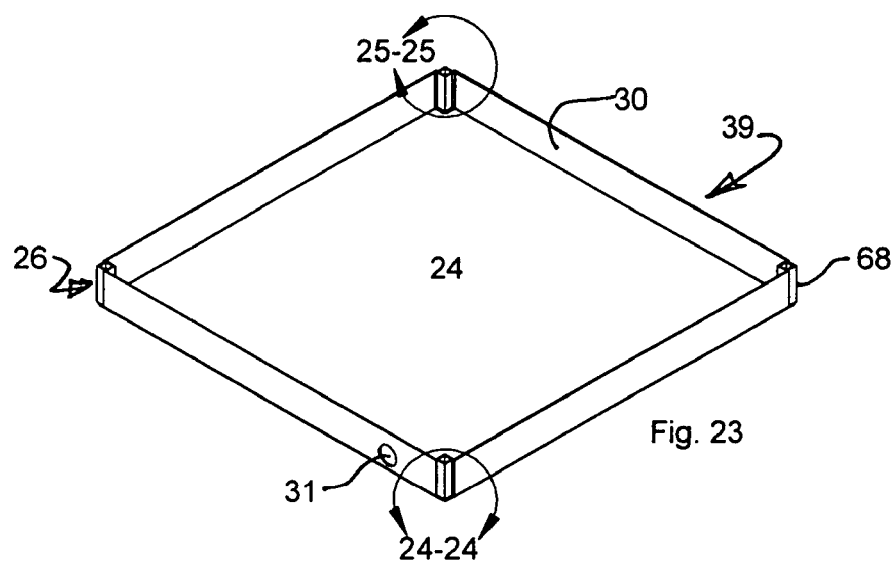
FIG. 23 is a perspective view of an alternative embodiment of a base.
Figure 24:
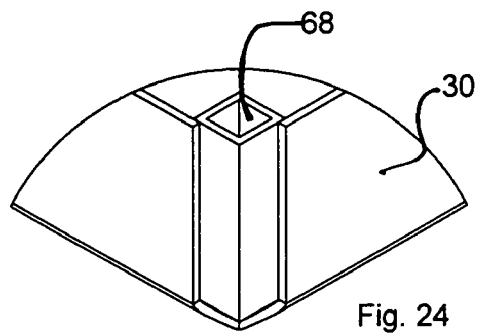
FIG. 24 is a perspective of a corner detail of the base of FIG. 23, taken along 24-24 of FIG. 23.
Figure 27:
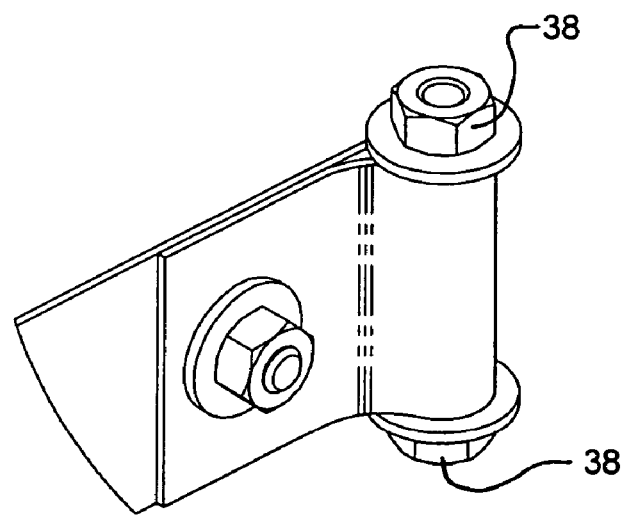
FIG. 27 is a perspective view of a detail of a connector used on the strap of FIG. 26, taken along 27-27 of FIG. 26.
Figure 26:
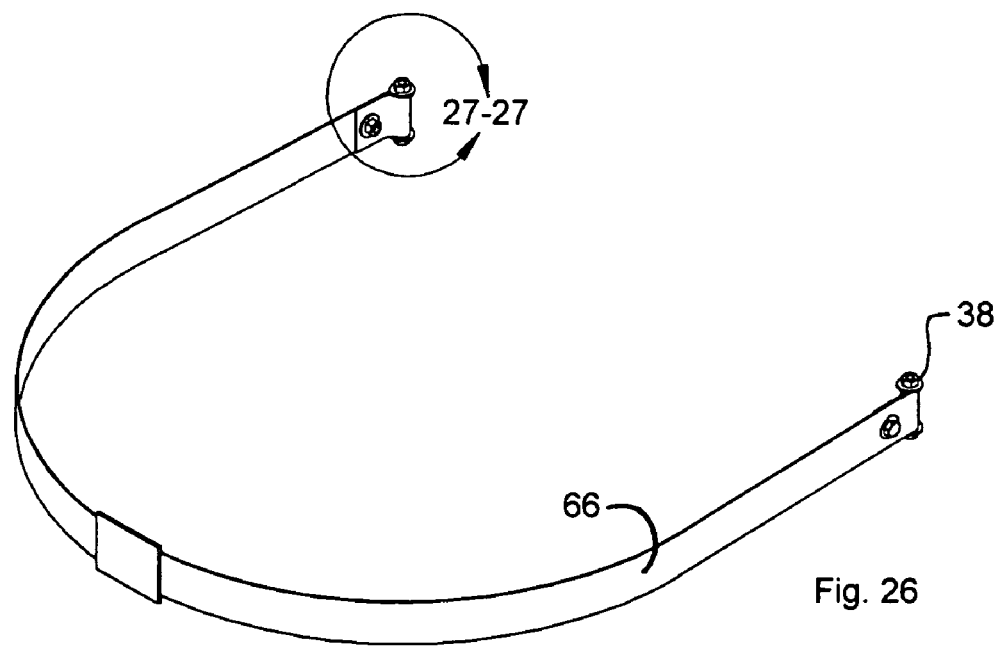
FIG. 26 is a perspective view of the strap used on FIG. 15.

Referring to FIGS. 23-25, a further embodiment is shown for the connectors 26. The base 24 has side walls 30 as before. The connectors 26 are formed by tubes 68 having a square cross section, with the tubes 68 placed into the corners and fastened to the distal edges of two adjacent side walls 30. Advantageously the length of the side walls 30 are selected so they slightly overlap the tube 68. The tube 68 is fastened to the side walls by welding or gluing, with a weld bead 70 shown in FIG. 25. The welding advantageously provides a watertight or leak-proof joint. The joined parts can be electroplated or painted or caulked as needed to achieve the desired level of confidence that the corners will not leak.

The base 32, side walls 30 and connectors 26 (formed by tubes 63) again form a lower frame 39, with the connectors being fastened to at least one of the base or side walls. The tubes 68 are used as in the embodiment of FIG. 1, with the rods 28 passing through the tubes 68, and with nuts 38 and washers (as needed) holding the tubes 68 and attached base 24 in the desired position.

The lower frame 39 shown in FIGS. 23-25 is advantageously formed mostly or entirely from a single sheet of metal. The side walls 30 are cut to form a suitable gap within which to place the tubes 68, and then the side walls 30 are bent perpendicular to the base 24. The tubes 68 are cut to length and placed in the gap between distal ends of two adjacent side walls 30. The tubes 68 are then welded in place or otherwise fastened in place.

Figure 22:
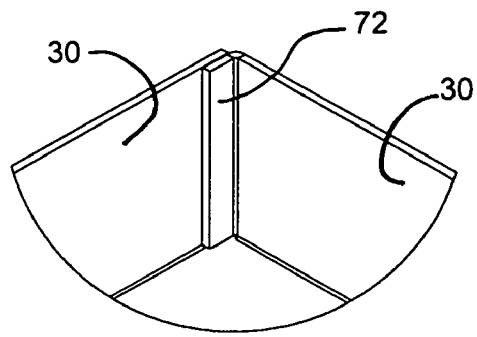
FIG. 22 is a perspective of a corner detail of the base of FIG. 20, taken along 22-22 of FIG. 20.
Figure 20:
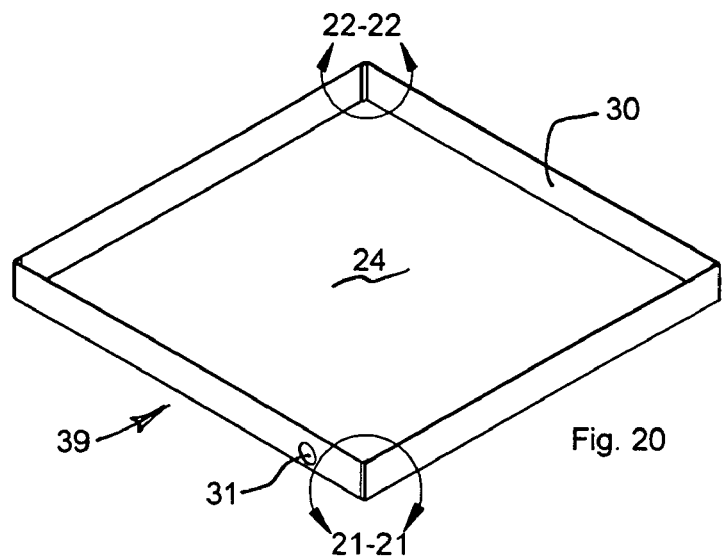
FIG. 20 is a perspective view of an alternative embodiment of a base.
Figure 21:
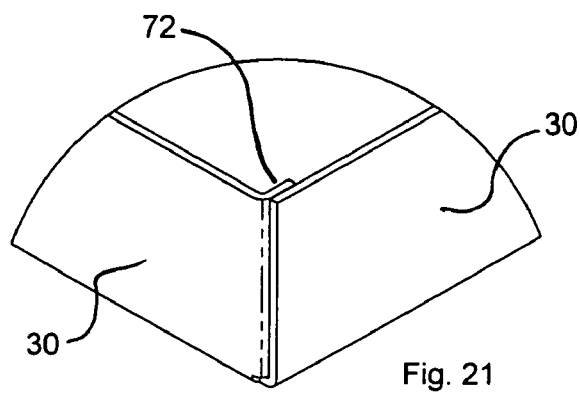
FIG. 21 is a perspective of a corner detail of the base of FIG. 20, taken along 21-21 of FIG. 20.

Referring to FIGS. 20-22, a further way of forming the base 24 and side walls 30 is shown in which the side walls 30 are not all formed the same as in previous embodiments. At least one distal end of an adjacent side wall 30 is bent to form a short leg or flange 72 extending perpendicularly from the distal end of the side wall 30 and toward the adjacent side wall 30, but offset by the thickness of the material on the adjacent side wall 30 so that the flange 72 abuts the adjacent side wall 30. The flange 72 is bonded, welded, riveted, mechanically fastened or otherwise fastened to the adjacent and abutting side wall 30. A connector 26 from one of the other embodiments can then be fastened to the corner, or to the base 24 and side walls 30 to form a lower frame 39. While the connectors 26 are shown with straight sides for use with straight side walls 30, the flanges of connector 26 could be curved to mate with and fasten to curved side walls 30.

The suspension members 28 advantageously fasten to connectors 28 at a location offset from the base 24. Alternately an opening in side wall 30 or base 24 can be formed to connect to the rod 28 without the advantage of the localized stiffening and strengthening provided by the connector 26, and without the advantage of a raised or offset connection location provided by the connector 26. But if the rods or members 28 fasten directly to the side walls 30 or base 24, then the part to which the member is connected must be sufficiently strong as the connector 26 provides localized strengthening for the connection. The base 24 is made of 12 gauge material that is considerably stronger than the thin pans sometimes used in the prior art, and the base 24 is sufficient to support (with a suitable safety margin) the weight of the apparatus 20, which can reach and sometimes exceed 500 pounds. Simply forming a hole in the base 24 is thus possible. But if it is desired to fasten to the base 24, then advantageously a strengthened connection 26 is formed in the base 24 and adapted to connect to the support 28. If it is desirable to fasten directly to the side wall 30, then advantageously a strengthened connection 26 is formed in the side wall and adapted to connect to the support 28.

There is thus advantageously provided a lower frame having a base 24 to support an appliance 20. Side walls 30 joined by corner connectors 26 are preferably provided to form a leak-proof enclosure in combination with the base 24. The side walls 30 have the further advantage of limiting the sideways motion of the appliance 20 supported within the side walls 30. This suspended platform 22 can be further improved and stiffened by providing a top frame 62 which uses the rods 28 to form a frame around the top, bottom and sides of the water heater 20.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention, including various ways of fastening the top and bottom frames to the supports 28. Further, the various features of this invention can be used alone, or in varying combinations with each other and are not intended to be limited to the specific combination described herein. Thus, the bottom frames formed by base 24 and side walls 30 joined by connectors 26 could be used as the top frame 62, and the base 24 could be omitted so the side walls 30 joined by connectors 26 could be used as the top frame 62, with or without one or more of the diagonal brace members 40. Thus, the invention is not to be limited by the illustrated embodiments but is to be defined by the following claims when read in the broadest reasonable manner to preserve the validity of the claims.

What is claimed is:

1. A suspended platform for suspending an appliance from a plurality of support members which depend from overhead beams and structures of a building, comprising:
   a lower frame having a base with side walls extending from the base and joined to form a fluid tight container within which the appliance rests during use of the platform, the base having sufficient strength to support the appliance thereon when the lower frame is suspended from the support members and the entire weight of the appliance is carried only by the base when the appliance weighs about 500 pounds or more;
   at least three connectors each fastened to at least one of the side walls and base, each connector being configured to removably fasten to a different one of the support members, wherein a plurality of the connectors each comprises at least two flanges each fastened to a different sidewall; and
   a drain fitting on one of the side wall or base.

2. The suspended platform of claim 1, wherein the at least three connectors comprise connector means for passing the support members through a portion of the lower frame.

3. The suspended platform of claim 1, wherein the side walls of the lower frame form a plurality of corners, and the connectors comprise tubes located at those corners and connected to the side walls, the tubes being sized to allow passage of the support members.

4. The suspended platform of claim 1, wherein the base is rectangular with a connector at each corner.

5. The suspended platform of claim 1, wherein the connectors each have a plate extending over the base, the plate having a hole sized to allow passage of one of the depending support members.

6. The suspended platform of claim 1, further comprising at least three support members in the form of depending threaded rods, and wherein the connectors each have a plate extending over the base with a different one of the rods extending through each hole, and with an upper nut threadingly engaging the rod above the plate and a lower nut threadingly engaging the rod below the plate to position the connector between the nuts.

7. The suspended platform of claim 1, further comprising at least four depending support members arranged in a rectangle, the support members each having a distal end fastened to a different one of four connectors.

8. The suspended platform of claim 1, further comprising at least four depending support members arranged in a rectangle, the support members each having a distal end fastened to a different one of four connectors, and two diagonal brace members extending between and fastened to diagonally opposed support members above the location of the appliance and above the lower support frame.

9. The suspended platform of claim 8, wherein the depending members comprise threaded rods.

10. The suspended platform of claim 8, wherein the depending members comprise threaded rods each having a distal end fastened to a different one of the connectors by a threaded connection.

11. The suspended platform of claim 1, further comprising at least one strap having opposing distal ends each of which is configured to fasten to a different one of the depending support members during use of the suspended platform.

12. The suspended platform of claim 1, further comprising at least three depending support members each fastened to a different one of the connectors, and at least two adjustable length ties fastened to one of the lower platform or depending support members.

13. A kit for suspending an appliance from a plurality of support members which depend from overhead beams and structures of a building, comprising:
a lower frame having a base with side walls extending from the base and joined to form a fluid tight container, the base having sufficient strength to support an appliance thereon weighing about 500 pounds when the lower frame is suspended from the support members and the entire weight of the appliance is carried only by the base;
at least three connectors each fastened to at least one of the side walls and base, each connector being configured to removably fasten to a different one of the support members; and
a threaded drain fitting on one of the side wall or base.

14. The kit of claim 13, wherein the lower frame is a rectangle with the connectors located at each corner, and further comprising an upper frame having four sides with the diagonal members having openings through which the depending support members can pass during use of the support members.

15. The suspended platform of claim 13, wherein the at least three connectors comprise connector means for passing the support members through a portion of the lower frame.

16. The kit of claim 13 further comprising at least one strap having opposing distal ends each of which is configured to fasten to a different one of the depending support members during use of the suspended platform.

17. The kit of claim 13 further comprising at least two adjustable length ties having one end configured to fasten to one of the lower platform or depending support members.

18. The kit of claim 13, further comprising a plurality of threaded fasteners sized to fasten a plurality of the connectors to depending threaded support rods during use of the kit.

19. The kit of claim 13, further comprising at least two diagonal braces each having distal ends configured to fasten to the depending support members.

20. A suspended platform for suspending an appliance from a plurality of support members which depend from overhead beams and structures of a building, comprising:
lower frame means for supporting a base on which an appliance weighing about 500 pounds or more rests during use of the suspended platform and for cooperating with the base to form a waterproof container;
connector means on the lower frame means for connecting the lower frame means to the support members; and
upper frame means for fastening to the appliance during use of the suspended platform.

21. The suspended platform of claim 20, wherein the lower frame means has corners and the connector means comprise tubes fastened at corners of the lower frame means, the tubes being sized to allow passage of the support members.

22. The suspended platform of claim 21, wherein the lower frame means has a plurality of corners each formed by two adjacent side walls, and the connector means include corner braces fastening to two adjacent side walls with the corner braces being connected to a further part that connects to one of the support members during use of the suspended platform.

23. The suspended platform of claim 21, further comprising an upper frame connected to the support members during use of the suspended platform, for stabilizing the suspended platform.

24. A suspended platform for suspending an appliance from overhead beams and structures of a building, comprising:
a lower frame having a base, the base having side walls extending therefrom and joined to form a fluid tight container, the base having sufficient strength to support the appliance thereon when the lower frame is suspended from the support members and the entire weight of the appliance is carried only by the base when the appliance weighs about 500 pounds or more;
at least three connectors each fastened to at least one of the side walls and base, each connector being configured to removably fasten to a different one of the support members; and
further comprising at least four depending support members arranged in a rectangle, the support members each having a distal end fastened to a different one of four connectors, and two diagonal brace members extending between and fastened to diagonally opposed support members above the location of the appliance and above the lower support frame.

25. A suspended platform for suspending an appliance from overhead beams and structures of a building, comprising:
a lower frame having a base with side walls extending from the base and joined to form a fluid tight container within which the appliance rests during use of the platform, the base having sufficient strength to support the appliance thereon when the lower frame is suspended from the support members and the entire weight of the appliance is carried only by the base when the appliance weighs about 500 pounds or more;
at least three connectors each fastened to at least one of the side walls and base, each connector being configured to removably fasten to a different one of the support members;
a drain fitting on one of the side wall or base; and
further comprising at least four depending support members arranged in a rectangle, the support members each having a distal end fastened to a different one of four connectors, and two diagonal brace members extending between and fastened to diagonally opposed support members above the location of the appliance and above the lower support frame.

26. A suspended platform for suspending an appliance from overhead beams and structures of a building, comprising:
a lower frame having a base with side walls extending from the base and joined to form a fluid tight container within which the appliance rests during use of the platform, the base having sufficient strength to support the appliance thereon when the lower frame is suspended from the support members and the entire weight of the appliance is carried only by the base when the appliance weighs about 500 pounds or more;
at least three connectors each fastened to at least one of the side walls and base;
a drain fitting on one of the side wall or base; and
at least three depending support members each having a distal end fastened to a different one of the connectors, each connector being configured to removably fasten to a different one of the support members, the support members comprising threaded rods.

* * * * *